Patented Apr. 29, 1924.

1,492,282

UNITED STATES PATENT OFFICE.

FREDERICK MARK BECKET AND ALEXANDER L. FEILD, OF NEW YORK, N. Y., ASSIGNORS TO UNION CARBIDE & CARBON RESEARCH LABORATORIES, INC., A CORPORATION OF NEW YORK.

PROCESS FOR RECOVERING VALUES FROM METAL-BEARING SOLUTIONS.

No Drawing. Application filed August 3, 1922. Serial No. 579,483.

*To all whom it may concern:*

Be it known that we, FREDERICK MARK BECKET and ALEXANDER L. FEILD, citizens of the United States, residing at New York, in the county of New York and State of New York, have invented certain new and useful Improvements in Processes for Recovering Values from Metal-Bearing Solutions, of which the following is a specification.

This invention is a process of separating metals from their solutions, and it is particularly adapted for the precipitation of gold and silver from solutions obtained by leaching ores.

Solutions obtained by cyaniding gold and silver ores have heretofore been treated for the recovery of their values by bringing them into contact with metallic zinc, whereupon the precious metal is precipitated and an equivalent quantity of the zinc goes into solution in the form of a cyanide compound. This compound is not the equivalent of alkali metal cyanide for dissolving more metal, and more alkali metal cyanide must be added to bring the solution to full activity for reuse.

Aluminum has also been used for the same purpose. This metal is free from the above noted objectionable feature of depleting the effective cyanide content of the solution, but it is difficult to prepare the subdivided aluminum required. The present invention affords a method for recovering the values from various metal-bearing solutions by the use of a material which is readily brought to any desired degree of subdivision, and which may be used in cyanide solutions without depleting their effective cyanide content.

In an application filed simultaneously herewith in the name of Frederick M. Becket, Serial No. 579,585, there is disclosed a process in which silicon metal, either in pure form or mixed or alloyed with substantially inert metals, is used as a precipitating agent, the reaction probably proceeding according to some such equation as the following:

$$4NaAg(CN)_2 + Si + 6NaOH = 8NaCN + 4Ag + Na_2SiO_3 + 3H_2O.$$

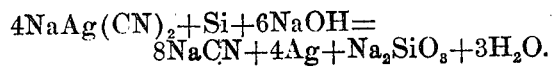

Possibly some of the silicon may be wasted by the re-action represented by the equation:

$$2NaOH + Si + H_2O = Na_2SiO_3 + 2H_2.$$

When silicon material of the kind described in that application is employed, it is usually desirable to divide the silicon material very finely and to heat the solution in order to shorten the time required for precipitation. We have found that precipitation can also be accelerated to a very marked degree by alloying the silicon with a metal of Group II or Group III of the periodic table having an atomic weight below 200: for example, magnesium, calcium, barium or aluminum. Excellent results have been obtained with the calcium-silicon alloy.

The use of such alloys also makes it possible to secure complete precipitation from solutions which are not so strongly alkaline as are required when silicon alone or associated with substantially inert materials is used.

We have established by experiment that the reactive metal, for example calcium, associated with the silicon, is not the sole reducing agent, but that the silicon itself exerts a reducing action, and that the action of the silicon is more energetic because of the association therewith of the alloyed metal. This is shown by calculating the rate at which silicon dissolves from determinations of the silicon content of the solution at intervals. When the silicon is alloyed with calcium and like metals, it is found that with a given alkalinity and temperature, silicon is dissolved at a greater rate, a more rapid precipitation of the precious metal by the silicon constituent of the alloy being the result. For this reason, we term the metal alloyed with the silicon an "activating" metal.

The invention is not restricted to alloys of any particular composition, as the proportions of silicon and the metal alloyed therewith may be varied over a wide range. Calcium-silicon alloys containing calcium in percentages varying from 3 to 20% have been used with excellent results.

The invention has been described in connection with the recovery of gold and silver, but it is not restricted to such use since other heavy metals may be recovered from their solutions by procedure similar to that described herein.

We claim:

1. Process of precipitating heavy metals from their alkaline solutions which comprises bringing the solution into contact with an alloy of silicon and an activating metal.

2. Process of precipitating precious metals from their solutions which comprises bringing the solution into contact with an alloy containing silicon and a metal of the second periodic group having an atomic weight below 200.

3. Process of precipitating precious metals from cyanide solutions which comprises bringing the solution into contact with an alloy containing silicon and calcium.

In testimony whereof, we affix our signatures.

FREDERICK MARK BECKET.
ALEXANDER L. FEILD.